United States Patent [19]

Gardner

[11] 4,325,633

[45] Apr. 20, 1982

[54] APPARATUS FOR DETERMINING OF ANGLE OF INCIDENCE OF ELECTROMAGNETIC ENERGY

[75] Inventor: Leland V. Gardner, Buellton, Calif.

[73] Assignee: Hughes Aircraft Company, Culver City, Calif.

[21] Appl. No.: 155,887

[22] Filed: Jun. 2, 1980

[51] Int. Cl.³ .................. G01B 11/26; G02B 5/14
[52] U.S. Cl. .................. 356/141; 250/227; 356/152; 356/400
[58] Field of Search .................. 356/141, 152, 400; 250/227

[56] References Cited

U.S. PATENT DOCUMENTS 3,254,557  6/1966  Brake et al. .................. 250/227
3,555,285  1/1971  Irving .................. 356/152
3,966,329  6/1976  Dickey .................. 356/152

Primary Examiner—S. C. Buczinski
Attorney, Agent, or Firm—William J. Benman, Jr.; William H. MacAllister

[57] ABSTRACT

An optic receiver capable of detecting the angle of incidence of optical energy relative to an airborne frame of reference. Incoming reflected rays are reflected by a one piece detector element into a line image. Power distribution along the line image varies with the azimuth of the target. Computation of target azimuth from the power distribution along the line image is facilitated by photodetectors mounted on this element and associated electronic circuitry.

10 Claims, 10 Drawing Figures

APPARATUS FOR DETERMINING OF ANGLE OF INCIDENCE OF ELECTROMAGNETIC ENERGY

BACKGROUND OF THE INVENTION

1. Field of the Invention

This invention relates to electromagnetic detectors. More specifically, it relates to an improved detector that provides an indication of the angle of incidence of electromagnetic energy.

While the present invention is described herein with reference to particular optical embodiments, it should be understood that the invention is not limited thereto. The optic receiver of the present invention may be adapted and employed for a variety of electromagnetic requirements as those skilled in the art will recognize in light of the present disclosure.

2. Description of the Prior Art

Conventional techniques for obtaining the azimuth or angle of incidence of optical or other electromagnetic energy typically utilize either an array of directional detectors or a single directional detector adapted to rotate through the target plane.

The array approach requires the use of a plurality of highly directional receivers. Each receiver is assigned a section of the area to be scanned. In an optical system, each receiver would include a photodetector and associated electronic circuit so that any optical energy detected made by the receiver would be electrically interpreted as coming from a predetermined direction.

Obviously, this approach can be costly where accurate angle determinations must be made. That is, the cost/performance of such a system would depend on the number of detectors or receivers required. Moreover, no matter how many receiver elements are utilized, accuracy would be limited by the inherent shortcomings of a discrete system. That is, it is impossible to determine exactly where the image is within the assigned sector.

These shortcomings can be avoided somewhat by utilizing the rotating receiver approach of the alternative technique. Here a highly directional receiver element is mounted for rotation so that a single receiver element can scan the desired area. This technique can be somewhat more accurate than that of the dedicated array insofar as the exact angle at which the element is pointing is known. However, the rotating element approach suffers from limitations common to mechanical systems, i.e., speed and durability.

The response time of a system utilizing this technique would be much longer than that of the dedicated array. Actual response could be improved somewhat by using several receiver elements, however, where ultra fast response is required this solution probably would not justify the additional cost.

In addition, the mechanical nature of a rotating element system would limit its reliability over a long period of use.

A third approach calls for the utilization of linear detector arrays with complicated lenses having a fairly high resolution over large fields of view. Such lenses are currently so expensive as to minimize their cost effectiveness for most conventional applications.

SUMMARY OF THE INVENTION

Thus it is an object of the present invention to provide an improved receiver for ascertaining the angle of incidence of electromagnetic energy.

It is a more specific object of the present invention to provide an economical optic receiver capable of rapidly making a simple determination of target azimuth within a large field of view.

The objects of this invention are achieved by a receiver including an element and a detector. The element is adapted to transform incoming electromagnetic energy to a line image having a radiant power distribution along its length which is peculiar to angle of incidence thereof. The line image as power distribution is then measured by the detector to provide an electrical signal proportional to the angle of incidence. The receiving element includes input and output apertures. The sides of the element are coated to provide reflective interior surfaces. A reflective rear surface is provided which is curved to reflect light entering the input aperture to the output aperture as a single line image. The element is constructed so that the power distribution along the length of the line image is peculiar to the angle of incidence of the incoming energy.

The detector is mounted on the output aperature so as to measure the power distribution along the line image and provide an electrical output proportional thereto.

The present invention is simple, accurate and inexpensive compared to the above mentioned prior art systems. While specific embodiments are disclosed herein, it is understood that the teachings of this invention may be employed to provide detector elements of diverse sizes, shapes, and materials without departing from the scope of this invention.

DETAILED DESCRIPTION OF THE INVENTION

Figure 1:
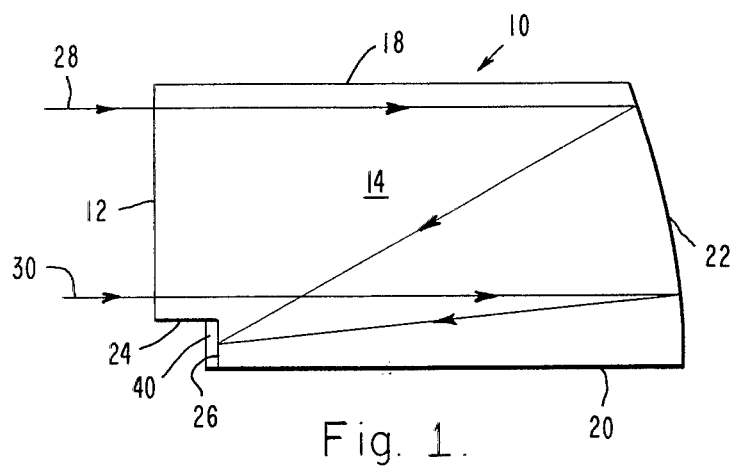
FIG. 1 is a side elevational view of an embodiment utilizing the principles of this invention.
Figure 2:
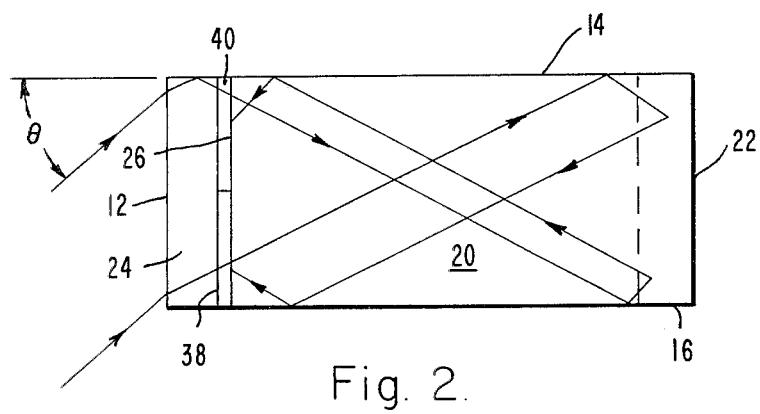
FIG. 2 is a bottom view of the embodiment of FIG. 1.

An embodiment utilizing the principles of the present invention is shown in FIG. 1. FIG. 1 shows a side elevational view of an optic receiver 10. FIG. 2 shows a bottom view. The receiver 10 is made of a single block of solid glass or other suitable material. It has a flat, rectangular, transparent forward surface 12 which provides an input aperture. Two generally flat, reflective surfaces 14 and 16 delimit the sides of the receiver 10. Surfaces 18 and 20 are nonfunctional and would be ground and painted black. A parabolic cylinder or elliptic reflector 22 provides a rear surface for the receiver 10. The elliptical curvature of the reflector 22 is described by the equation:

$$\frac{X^2}{A^2} + \frac{Y^2}{B^2} = 1 \tag{1}$$

where
  X = coordinate on X axis
  Y = coordinate on Y axis
  A = major semi-axis
and
  B = minor semi-axis In the case where A is very large relative to B, the ellipse approximates a parabola so closely that the difference is not significant. The corner provided by surfaces 12 and 20 is cut away to provide surfaces 24 and 26. Planar transparent surface 26 provides the output aperture.

FIG. 1 shows that rays of light 28 and 30, reflected from a distant target, enter the receiver 10 through the transparent surface 12. Rays 28 and 30 then strike the elliptical or parabolic reflector 22. The elliptic curvature of the surface 22 is such that all rays are reflected to a line image at surface 26. Photodetectors 38 and 40 are mounted on the surface 26 parallel to the line image.

Figure 3A:
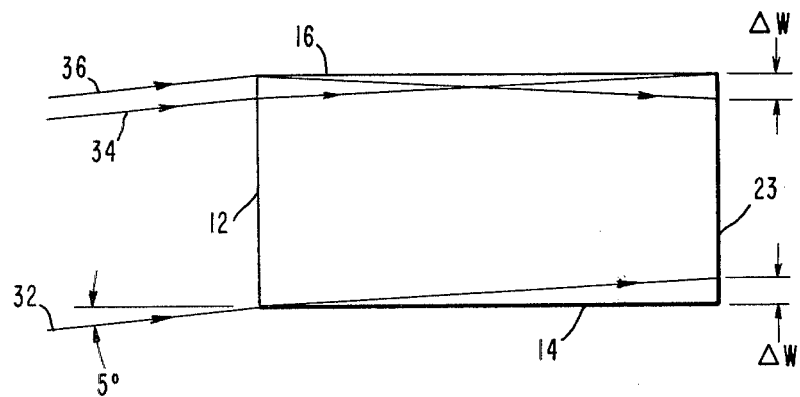
FIG. 3a-3c are illustrative top views of the embodiment of FIG. 1.

As illustrated in FIG. 3, the power distribution along the length of the line image at surface 26' varies predictably with roll angle. In FIG. 3, the receiver 10 is shown without the surface 22 for clarity of explanation. Rays 32, 34, and 36 are shown passing through surface 12 directly to flat surface 23. Rays 32 and 36 are the extreme rays that can enter the receiver 10. As shown in FIG. 3a, ray 34 penetrates the surface 12 and terminates at the intersection of surfaces 16 and 23.

In the 0° azimuth case (not shown) all incoming rays enter the receiver 10 and uniformly illuminate the surface 23 with no side reflections or shadows. In the case of FIG. 3a, rays 32, 34 and 36 strike surface 12 at a 5° angle. As a result, an area of width $\Delta W$ on surface 23 between extreme ray 32 and surface 14 is in shadow and receives no power. The top corner of the receiver 10 is illuminated by ray 34, but rays between ray 34 and extreme ray 36 are reflected off surface 16 onto surface 23. The area on surface 23 thus illuminated also has width $\Delta W$. As this area is also directly illuminated by rays between rays 32 and 34, the area of width $\Delta W$ receives double power, while the area between the double power area and the no power area receives unit power.

Figure 3B:
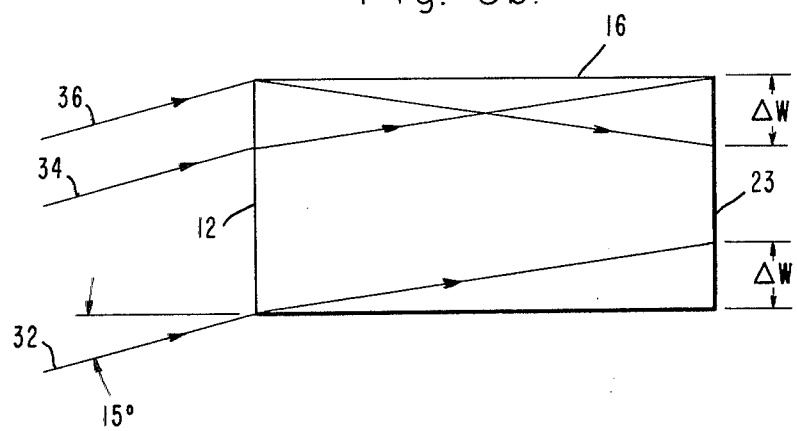
Figure 3C:
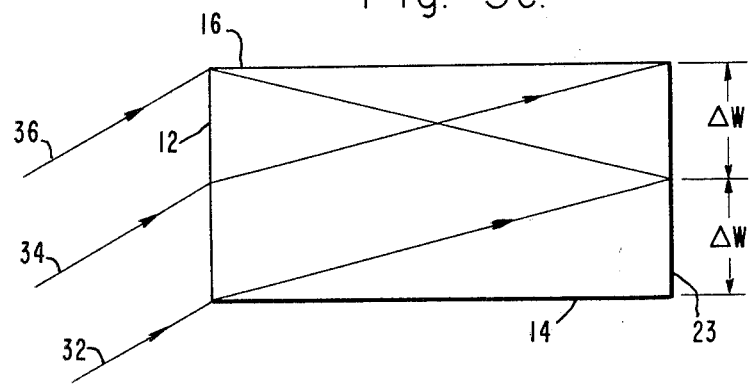

The 15° azimuth case of FIG. 3b shows the same effect as the 5° azimuth case of FIG. 3a. Note that the double and unit power areas of the 15° case have increased in size relative to those of the 5° case, while the unit power area has diminished. This suggests a relationship between the azimuth angle and the power distribution on the detector surface 23. The double power area and the no power area continue to expand with increasing roll or azimuth angle until the 22.5° case of FIG. 3c is attained. At 22.5° the no power area and the double power area are each one half the detector surface area 23. There is no unit power area.

Up to this point, the power distribution on the detector surface 23 is unique for all roll angles. Since all light illuminating the detector surface 22 is reflected to a line image on surface 26, the power distribution along the length of the line image varies with roll angle in the manner described above.

The power distribution along the line image on surface 26 can be analyzed by conventional electronic techniques to determine the target azimuth as follows. Two photodetectors 38 and 40 are placed on surface 26 as shown in FIG. 2. (A single line detector with a small break at its center may also be utilized.) Each detector covers an area between the center of the surface 26 and the edge of the receiver 10.

The radiant power on each detector is determined in the following manner. Since the initial radiance on the entrance aperture 12 is uniform, the energy distribution along the line image on surface 26 would be uniform except for those areas $\Delta W$ in which the radiant power has been doubled or deleted. Thus the power P on each detector is proportional to $\frac{1}{2}$ the width of the element $W + \Delta W$. Accordingly, the power $P_1$ on the first detector 38 can be given by the expression:

$$P_1 = K\left(\frac{W}{2} + \Delta W\right); \tag{2}$$

and the power $P_2$ on the second detector 40 can be given by the expression:

$$P_2 = K\left(\frac{W}{2} - \Delta W\right); \tag{3}$$

where K is a proportionally constant. It can be shown that:

$$W = 2L \operatorname{Tan} \operatorname{Sin}^{-1} \frac{\operatorname{Sin} \theta}{n} \max \tag{4}$$

and $$\Delta W = L \operatorname{Tan} \operatorname{Sin}^{-1} \frac{\operatorname{Sin} \theta}{n} \tag{5}$$

where
  $\theta$ is the roll angle,
  $\theta_{max}$ is the selected roll angle limit,
  W is the element width,
  L is the path length over which side reflections occur, and
  n is the index of refraction of the element.

It follows that if $P_1 > P_2$ the energy is from the left of center and $$\theta = \theta_{max} 2 \frac{P_1}{P_1 + P_2} - 1. \tag{6}$$

Similarly, if $P_2 > P_1$ the energy is from the right of center and $$\theta = \theta_{max} 2 \frac{P_2}{P_1 + P_2} - 1. \tag{7}$$

Thus equations 6 and 7 permit the angle $\theta$ to be calculated by conventional electronic means utilizing only the power measured by the photodetectors 38 and 40 mounted on surface 26.

Figure 4:
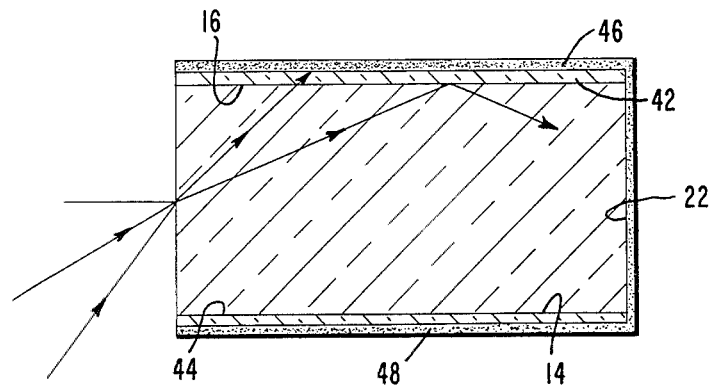
FIG. 4 is an illustrative top view of a half-section of the invention.

It should be noted that the angle $\theta_{max}$ of 22.5° in the preferred embodiment is a matter of design choice and totally arbitrary. As shown in FIG. 4, any cutoff angle up to 90° could be obtained by selecting system parameters L, W and n within the ambit of equation (4) above and by applying optical cladding layers 42 and 44, of a lower index of refraction to the reflecting sides 16 and 18 of the receiver element 10. Rays entering the receiver 10 at roll angles less than $\theta_{max}$ will reflect without absorption off the cladding 42 or 44. Rays entering at roll angles greater than $\theta_{max}$ will penetrate the cladding 42 and 44 and impinge upon the black layers 46 and 48. The black layers 46 and 48 will thus remove such rays from the system by absorption.

The critical roll angle $\theta_{max}$ is related to the index of refraction of the glass (n) and the index of refraction of the cladding $n_c$ as follows:

$$\sin^2\theta_{max} = n^2 - n_c^2. \quad (8)$$

Chart 1 lists several acceptable combinations of glass and cladding.

CHART 1

| GLASS | INDEX | CLADDING | INDEX | ROLL ANGLE CUT |
|---|---|---|---|---|
| Fused Quartz | 1.4517 | SrF$_2$ | 1.40 | 22.58° |
| fK3 | 1.4576 | SrF$_2$ | 1.40 | 23.94° |
| BK1 | 1.5024 | SiO$_2$ | 1.4517 | 22.76° |
| K7 | 1.5031 | SiO$_2$ | 1.4517 | 22.94° |
| SF19 | 1.6497 | CeFl | 1.60 | 23.7° |
| BaSF2 | 1.6475 | CeFl | 1.60 | 23.13° |

For some of the core materials of Chart 1, the ratio of width W to length L of the receiver element 10 has been calculated and is listed in Chart 2.

CHART 2

| MATERIAL | n | W/L |
|---|---|---|
| SiO$_2$ | 1.4517 | .5466 |
| BK1 | 1.5024 | .5268 |
| SF19 | 1.6497 | .4770 |

Figure 5:
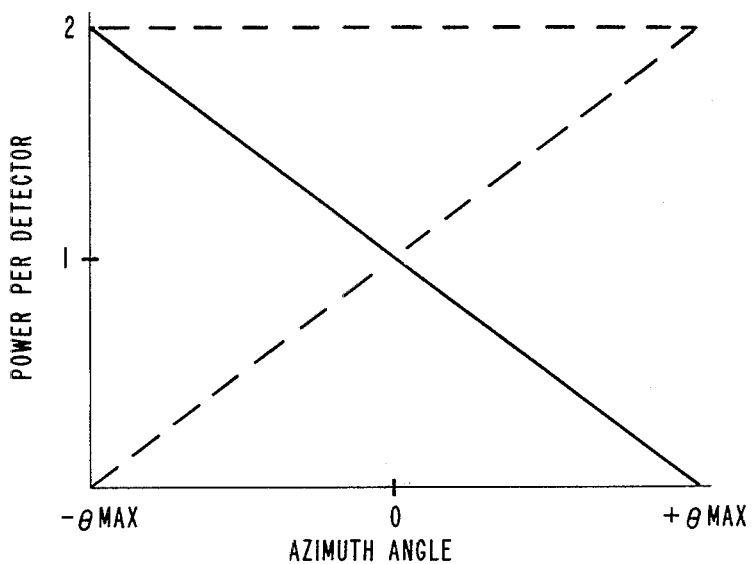
FIG. 5 is a graphical representation of the power output of the invention as a function of roll angle.

FIG. 5 shows the relative power on the two detectors 38 and 40 and the sum of the power ($P_1+P_2$) as a function of roll angle $\theta$. The power on either detector 38 or 40 varies linearly with roll angle to less than 1% deviation. The power on the two detectors always sums to a constant for any given target. One detector has double illumination at $+\theta_{max}$ while the other has zero. At $-\theta_{max}$ the conditions are reversed.

Figure 6:
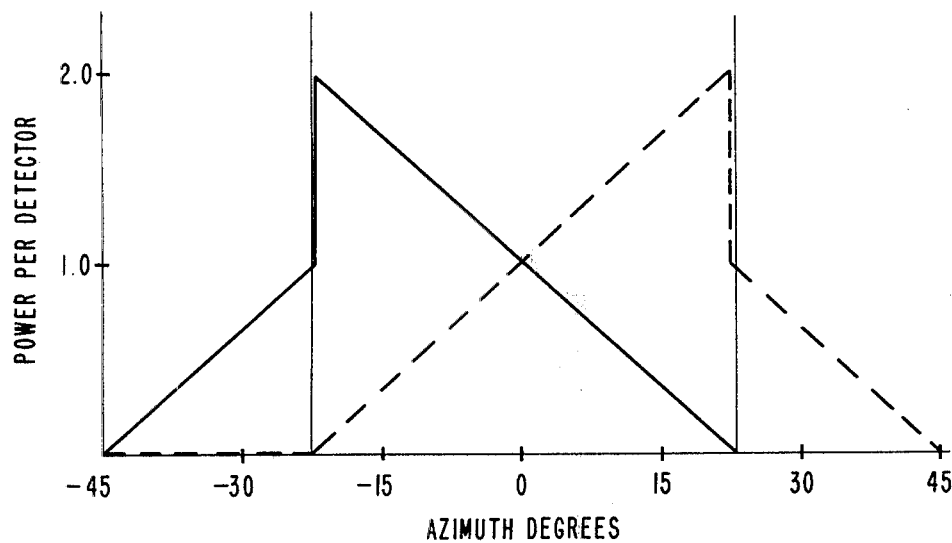
FIG. 6 is a graphical representation similar to that of FIG. 5 showing, in addition, the power distribution beyond 22.5 degrees azimuth.

FIG. 6 shows that beyond $\theta_{max}$, in this case 22.5°, the detector having double power will suddenly fall to half its peak then decrease linearly to zero at the 45° azimuth. This is because at 22.5° the roll control limit ($\theta_{max}$) is reached and the half of the beam that was reflected is absorbed. The half of the beam that was not reflected with have more and more of its rays absorbed with increasing roll angle until at 45° it is totally absorbed.

This extension of sensitivity beyond 22.5° is of little significance since the limits of the azimuth of transmitted power can be set at $\theta_{max}$ (22.5°) so that no target illumination will exist in the undesired area. Tramsitter beam control techniques are known in the industry and need not be discussed here.

Due to total internal reflectance, the side reflections of the receiver 10 are close to 100% efficient within roll angle limits $\pm\theta_{max}$. Thus for detection and ranging calculations, the two detector outputs 38 and 40 can be summed with no loss in aperture sensitivity.

Figure 7:
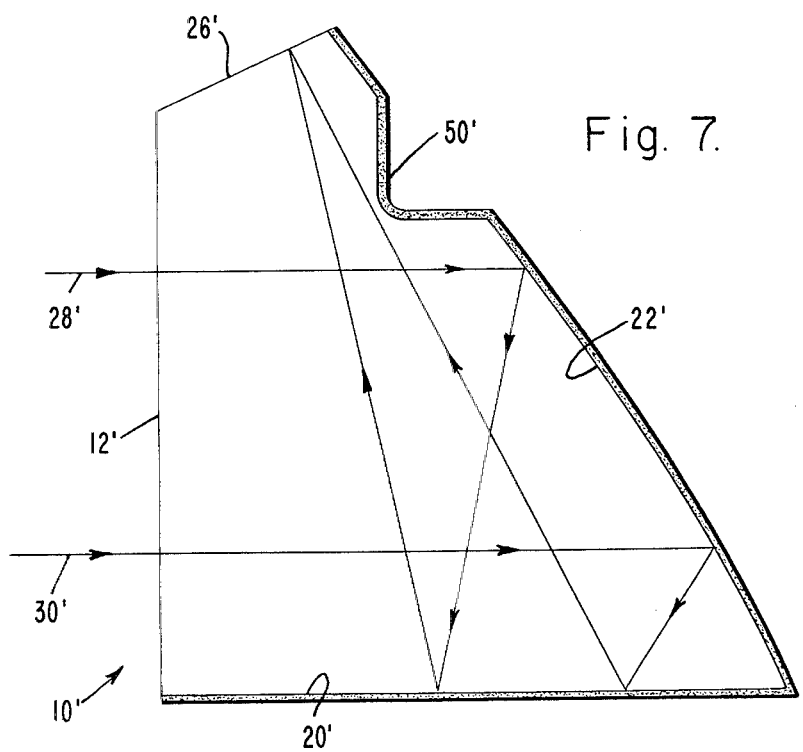
FIG. 7 is a side elevational view of an alternative embodiment of the invention.

FIG. 7 shows an alternate embodiment 10' of the receiver 10 of FIG. 1. The embodiment of FIG. 7 realizes the unique design of the receiver 10 while being somewhat more compact than the embodiment of FIG. 1. The receiver 10' is a single block of solid glass. It has a planar transparent forward surface 12'. Planar reflective surfaces 14' and 16' (not shown) delimit the sides of the receiver 10'. These surfaces are clad and blackened in the same manner as surfaces 14 and 16 of receiver 10. The receiver 10' has an elliptical cyclinder reflector 22' as a rear surface. The curvature of the surface 22' is also described by equation (1) above. Planar surface 20' is reflective. Surface 26' is transparent.

As shown in FIG. 7, surface 12' is the input aperture and surface 26' is the output aperture of the receiver 10'. Incoming rays 28' and 30' are reflected by surfaces 22' and 20' to form a line image on surface 26'. As shown in the perspective view of FIG. 8, photodetectors 38' and 40' (not shown) are mounted on surface 26' to detect the intensity variation along the line image on surface 26'.

Slot 50' is cut across surface 22' to block rays which cause a false line image at the surface 26' resulting from undesirable reflections due to targets at angles outside the range of the detector. This is especially important in minimizing detection of the sun or sunlit clouds in the vicinity of the detector surface. Saw slot 50' minimizes this potential problem by blocking rays which might be reflected by such clouds.

Figure 8:
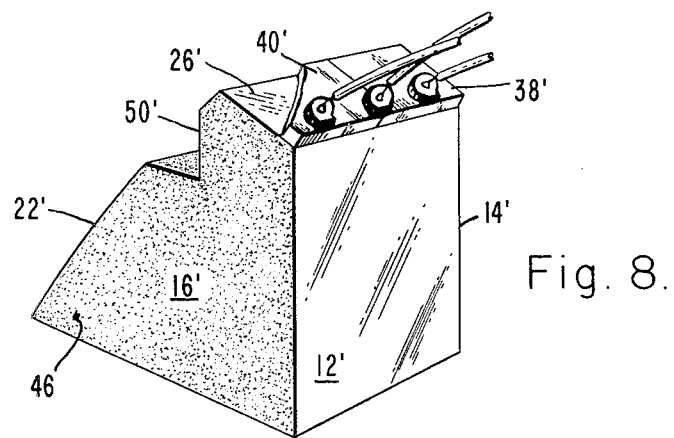
FIG. 8 is a perspective view of an alternative embodiment of the invention.

The embodiment of FIGS. 7 and 8 illustrates that the shape of the receiver 10 may be changed to meet a variety of requirements by those having ordinary skill in the art and the teachings of the present invention.

In addition, other changes and/or modifications of system parameters may be made without departing from the scope of this invention. It is therefore contemplated by the appended claims to cover these and any other modifications and embodiments which constitute the essential features of the present invention.

What is claimed is:

1. A receiver for providing an electrical signal corresponding to the angle of incidence of electromagnetic energy comprising:

a first planar surface for producing an input aperture;

second and third planar surfaces extending normally from said first planar surface so as to partially define a chamber therebetween, said second and third surfaces providing reflective interior side walls for said chamber;

a fourth planar surface extending substantially normally from said first, second and third surfaces which defines the interior ceiling of said chamber;

a fifth planar surface extending substantially normally from said first, second and third surfaces which defines the floor of said chamber;

a sixth surface joining said second, third, fourth and fifth surfaces to define the rear wall of said chamber, said sixth surface having a reflective side and being curved about an axis perpendicular to said second and third surfaces whereby electromagnetic energy which passes through said input aperture is reflected and focused by said sixth surface to a line image along which the radiant power distribution is proportional to the angle of incidence of said energy relative to said first surface; and detector means mounted on one of said surfaces parallel to said line image so as to measure the radiant power distribution thereof and thereby develop an electrical signal corresponding to the angle of incidence of electromagnetic energy.

2. The receiver of claim 1 wherein said second and third surfaces are cladded so that energy entering said input aperture at angles of incidence in a predetermined range are reflected and while those entering at angles of incidence outside a predetermined range are not reflected.

3. The receiver of claim 2 wherein a black layer is disposed on the reflective sides of said second and third surfaces to absorb energy entering said input aperture at angles of incidence outside said predetermined range.

4. The receiver of claim 1 wherein said line image is focused on said first surface and said detector means is mounted on said first surface.

5. The receiver of claim 1 including a seventh surface, said seventh surface being a transparent output aperture.

6. The receiver of claim 5 wherein said line image is focused on said seventh surface and said detector means is mounted on said seventh surface.

7. An optic receiver having:
a first planar transparent surface as an optical input aperture;
second and third planar surfaces extending normally from said first planar surface so as to partially define a chamber therebetween, said second and third surfaces being reflective and cladded on one side and blackened on the other so that rays of optical energy entering said input aperture at angles of incidence in a predetermined range are reflected, while those entering at angles of incidence outside said range are absorbed;
a fourth planar surface extending substantially normally from said first, second, and third surfaces which defines the ceiling of said chamber;
a fifth planar surface extending substantially normally from said first, second and third surfaces and having a reflective side which defines the floor of said chamber;
a sixth surface joining said second, third, fourth and fifth surfaces to define the rear surface of said chamber, said sixth surface having a reflective side which is curved whereby rays of light which pass through said input aperture are focused by said sixth surface to a line image on a seventh planar transparent surface, such that the radiant power distribution along said line image is proportional to the angle of incidence of said rays relative to said first surface; and
photodetector means mounted on said seventh surface parallel to said line image so as to measure the radiant power distribution thereof and thereby develop an electrical signal corresponding to the angle of incidence of said optical energy.

8. The receiver of claim 7 wherein said photodetector means includes two detectors.

9. The receiver of claim 1 wherein said photodetector means includes one photodetector split in the middle thereof.

10. The optic receiver element of claim 9 wherein said sixth surface includes a slot which extends transversely thereover from said second surface to said third surface.

* * * * *

UNITED STATES PATENT AND TRADEMARK OFFICE
CERTIFICATE OF CORRECTION

PATENT NO. : 4,325,633
DATED : 20 April 1982
INVENTOR(S) : Leland V. Gardner

It is certified that error appears in the above—identified patent and that said Letters Patent is hereby corrected as shown below:

On the title page

The title is --APPARATUS FOR THE DETERMINATION OF THE ANGLE OF INCIDENCE OF ELECTROMAGNETIC ENERGY-- instead of "Apparatus for Determining the Angle of Incidence of Electromagnetic Energy".

IN THE ABSTRACT, third line, delete "reflected", first occurrence; and

CORRECT THE ASSIGNMENT to reflect that the Assignee is the SANTA BARBARA RESEARCH CENTER, instead of the Hughes Aircraft Company.

Signed and Sealed this

Eighteenth Day of January 1983

[SEAL]

Attest:

GERALD J. MOSSINGHOFF

Attesting Officer     Commissioner of Patents and Trademarks